(12) United States Patent
Ross

(10) Patent No.: US 6,497,428 B2
(45) Date of Patent: Dec. 24, 2002

(54) SELECTABLE TRAILER HITCH APPARATUS

(76) Inventor: Robert H. Ross, Rt. 3, Box 123, Cottonwood, ID (US) 83522

( * ) Notice: Subject to any disclaimer, the term of this patent is extended or adjusted under 35 U.S.C. 154(b) by 0 days.

(21) Appl. No.: 09/971,224

(22) Filed: Oct. 4, 2001

(65) Prior Publication Data

US 2002/0024194 A1 Feb. 28, 2002

Related U.S. Application Data

(63) Continuation-in-part of application No. 09/457,992, filed on Dec. 9, 1999, now abandoned.
(60) Provisional application No. 60/113,880, filed on Dec. 28, 1998.

(51) Int. Cl.[7] .............................................. B60D 1/07
(52) U.S. Cl. ..................... 280/415.1; 280/511
(58) Field of Search ........................ 280/416.1, 415.1, 280/511, 504; D12/162

(56) References Cited

U.S. PATENT DOCUMENTS

| 4,456,279 | A | * | 6/1984 | Dirk | 280/416.1 |
|---|---|---|---|---|---|
| 4,662,647 | A | * | 5/1987 | Calvert | 280/490.1 |
| 4,807,900 | A | * | 2/1989 | Tate | 280/416.1 |
| 5,044,652 | A | * | 9/1991 | Brisson | 280/416.1 |
| 5,106,114 | A | * | 4/1992 | Haupt | 280/416.1 |
| 5,158,316 | A | * | 10/1992 | Hutchmacher | 280/415.1 |
| 5,322,313 | A | * | 6/1994 | Schroeder | 280/416.1 |
| 5,351,982 | A | * | 10/1994 | Walrath | 280/416.1 |
| 5,511,813 | A | * | 4/1996 | Kravitz | 280/495 |
| 5,562,298 | A | * | 10/1996 | Kass et al. | 280/406.1 |
| D379,608 | S | * | 6/1997 | Rodriguez | D12/162 |
| 5,857,693 | A | * | 1/1999 | Clark, Jr. | 280/415.1 |
| D415,725 | S | * | 10/1999 | Wyant | D12/162 |

* cited by examiner

Primary Examiner—F. Zeender

(57) ABSTRACT

A selectable trailer hitch apparatus is attached to a vehicle and includes a vehicle attachment member attached to the vehicle. With a first embodiment, the vehicle attachment member is a single horizontal structure. With additional embodiments, the vehicle attachment member includes a first horizontal hitch assembly support portion, a riser support portion, and a second horizontal hitch assembly support portion. The selectable trailer hitch apparatus permits one of a plurality of trailer hitches to be used at a time for a particular trailer. A base plate is attached to the vehicle attachment member. The base plate extends in a horizontal orientation and includes an axle reception channel. A plurality of trailer hitches are connected to the top side of the hitch-supporting selector plate. An axle is connected to the bottom side of the hitch-supporting selector plate, and the axle is inserted into the axle reception channel.

11 Claims, 5 Drawing Sheets

SELECTABLE TRAILER HITCH APPARATUS

RELATED APPLICATION

This application is a continuation-in-part of U.S. patent application, Ser. No. 09/457,992, filed Dec. 9, 1999, now abandoned, which was based on Provisional Application, Ser. No. 60/113,880, filed Dec. 28, 1998.

FIELD OF THE INVENTION

The present invention relates generally to trailer hitches and, more particularly, to an arrangement of a plurality of selectable trailer hitches.

DESCRIPTION OF THE PRIOR ART

When a trailer is connected to a motor vehicle, the motor vehicle has a trailer hitch for connecting to the trailer. The trailer hitch is generally permanently mounted on the motor vehicle, and once mounted, is difficult to remove or replace. A problem can arise when a specific trailer requires a trailer hitch of a specific size which is not mounted on the motor vehicle. In response to this problem, throughout the years, a number of innovations have been developed relating to providing a plurality of selectable trailer hitches that are mounted on the motor vehicle. In this respect, the following U.S. patents are representative of some of those innovations: U.S. Pat. Nos. 5,044,652, 5,106,114, 5,322,313, and 5,351, 982. More specifically, U.S. Pat. No. 5,044,652 discloses an apparatus which has a plurality of trailer hitches, each of which is directly connected to a locking pin which projects from the bottom of a respective trailer hitch. As a result, when a different trailer hitch is to be selected, all of the trailer hitches must be lifted off of a base and rotated to present a different trailer hitch for connection to a trailer. It would be desirable, however, if it were not necessary to lift the trailer hitches off of a base plate to select another trailer hitch.

U.S. Pat. No. 5,106,114 discloses an arrangement of selectable trailer hitches which also includes a bulky pintle hook supported by the same base plate which supports the trailer hitches. The bulky pintle hook can obstruct rotation of the array of trailer hitches on the base plate. In this respect, it would be desirable if an array of selectable trailer hitches were provided which does not include a bulky object which inhibits rotation of a plate upon which a plurality of selectable trailer hitches are supported. It is further noted that in U.S. Pat. No. 5,106,114 the trailer hitches are not arrayed symmetrically around the axle on which the trailer hitch support plate rotates. However, it would be desirable if the trailer hitches were arrayed symmetrically around the support plate rotation axle.

U.S. Pat. No. 5,322,313 discloses a rotatable hitch-mounting plate that is not in full registration with an underlying base plate. More specifically, a selected trailer hitch extends out from a base plate, and the selected trailer hitch is not directly supported by an underlying portion of the base plate. For greater stability of support for a selected trailer hitch, it would be desirable if a selected trailer hitch were directly supported by an underlying portion of a base plate. It is further noted that U.S. Pat. No. 4,807,900 discloses a trailer hitch that is also not fully supported by an underlying portion of a base plate.

U.S. Pat. No. 5,351,982 disclosed a support plate for a plurality of trailer hitches that is supported on a base plate by a wedge relationship between the trailer hitch support plate and the base plate. To avoid the complexities in fashioning a wedge relationship between the trailer hitch support plate and the base plate, it would be desirable if a selectable trailer hitch apparatus were provided which has a flat planar relationship between the trailer hitch support plate and the base plate.

Still other features would be desirable in a selectable trailer hitch apparatus. For example, for a stable and strong attachment between a base plate and a vehicle attachment member, it would be desirable if such an attachment were a welded attachment.

Another observation is made with respect to above-mentioned U.S. Pat. Nos. 5,044,652, 5,106,114, and 5,322, 313. With each of the trailer hitches in these respective patents, a respective vehicle attachment member is substantially horizontal and fits into a respective trailer-hitch supporting bracket on a vehicle. A respective hitch is located on top of a respective vehicle attachment member. As a result, the respective hitch is located in substantially the same plane as the trailer-hitch supporting bracket on the vehicle. Such an arrangement is satisfactory when the height of the portion of the trailer that is connected to the hitch is substantially the same height as the trailer-hitch supporting bracket on the vehicle. However, there are many instances where the portion of the trailer that is connected to the hitch is substantially lower than the trailer-hitch supporting bracket on the vehicle. In this respect, it would be desirable if a selectable trailer hitch apparatus were provided that is suitable for use in a situation where the portion of the trailer that is connected to the hitch is substantially lower than the trailer-hitch supporting bracket on the vehicle.

Different trailers can have different heights with respect to portions of the trailers that are connected to a hitch. In this respect, it would be desirable if a selectable trailer hitch apparatus were provided that is adjustable for different trailers which have different heights with respect to the portions of the trailers that are connected to a hitch.

There are some trailers that have a portion of the trailer that is connected to the hitch that is lower than the trailer-hitch supporting bracket on the vehicle. Conversely, there are other trailers that may have a portion of the trailer that is connected to the hitch that is higher than the trailer-hitch supporting bracket on the vehicle. In this respect, it would be desirable is a selectable trailer hitch apparatus were provided which is adjustable for trailers that have connections to trailer-hitch supporting brackets on vehicles from positions both lower than and higher than the trailer-hitch supporting brackets on the vehicles.

It is noted that U.S. Pat. No. 5,351,982 discloses a selectable trailer hitch apparatus which is supported at a level higher than the trailer-hitch supporting bracket on the vehicle. However, there is no provision for adjusting the height. Moreover, there is not disclosure that the selectable trailer hitch apparatus can be supported at a level lower than the trailer-hitch supporting bracket on the vehicle.

As stated above, it would be desirable if a plurality of trailer hitches are arrayed symmetrically around the support plate rotation axle. Moreover, for ease of use, it would also be desirable if locking pin reception channels are also arrayed symmetrically around the support plate rotation axle.

Thus, while the foregoing body of prior art indicates it to be well known to use a plurality of selectable trailer hitches, the prior art described above does not teach or suggest a selectable trailer hitch apparatus which has the following combination of desirable features: (1) wherein it is not necessary to lift the trailer hitches off of a base plate to select an alternate trailer hitch; (2) does not include a bulky object which inhibits rotation of a trailer hitch support plate; (3) includes plural trailer hitches arrayed symmetrically around the support plate rotation axle; (4) provides that a selected trailer hitch is directly supported by an underlying portion of a base plate; (5) provides a flat planar relationship between the trailer hitch support plate and the base plate; (6) provides a welded attachment between a base plate and a vehicle attachment member; (7) provides locking pin reception channels arrayed symmetrically around the support plate rotation axle; (8) is suitable for use in a situation where the portion of the trailer that is connected to the hitch is substantially lower than the trailer-hitch supporting bracket on the vehicle; (9) is adjustable for different trailers which have different heights with respect to the portions of the trailers that are connected to a hitch; and (10) is adjustable for trailers that have connections to trailer-hitch supporting brackets on vehicles from positions both lower than and higher than the trailer-hitch supporting brackets on the vehicles. The foregoing desired characteristics are provided by the unique selectable trailer hitch apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a selectable trailer hitch apparatus that includes a vehicle attachment member attached to the vehicle. With a first embodiment of the invention, the vehicle attachment member is a single, horizontal structure. A base plate is attached to the vehicle attachment member. The base plate is attached to the vehicle attachment member by a welded attachment. The base plate extends in a horizontal orientation and includes an axle reception channel. A hitch-supporting selector plate includes a top side and a bottom side, and a plurality of trailer hitches are connected to the top side of the hitch-supporting selector plate. The hitch-supporting selector plate is in registration with the base plate. An axle is connected to the bottom side of the hitch-supporting selector plate, and the axle is inserted into the axle reception channel. An axle retainer is connected to the axle for securing the axle in the axle reception channel. A selector plate lock is provided for locking the hitch-supporting selector plate in a selected position with respect to the base plate. The axle retainer includes a threaded end, and a lock nut is secured to the threaded end.

The selector plate lock includes a plurality of pin reception channels in the hitch-supporting selector plate, wherein each selector plate pin reception channel is associated with one of the trailer hitches. Three of the pin reception channels are arrayed around the axle at angular intervals of approximately one hundred twenty angular degrees. Three of the trailer hitches are arrayed around the axle at angular intervals of approximately one hundred twenty angular degrees. The pin reception channels are arrayed alternately between the trailer hitches at angular intervals of approximately sixty angular degrees. A pin reception channel is in the base plate. A lock pin includes a shaft portion and a head portion, and the shaft portion is insertable through a selected selector plate pin reception channel and the base plate pin reception channel when the selected selector plate pin reception channel and the base plate pin reception channel are placed in registration. A lock pin securing member retains the lock pin in a locking position with respect to the selected selector plate pin reception channel the base plate pin reception channel. The lock pin securing member is a cotter pin that is received in a cotter pin reception channel at a distal end of the lock pin shaft portion.

The vehicle attachment member includes a first end attached to the vehicle and includes a second end distal to the first end. The trailer hitches include a large size trailer hitch, an intermediate size trailer hitch, and a small size trailer hitch. The second end of the vehicle attachment member extends under the base plate pin reception channel and includes an attachment member axle reception channel for receiving the axle.

With a second embodiment of the invention, the vehicle attachment member includes a first horizontal hitch assembly support portion which supports the base plate. A riser support portion is connected to the first horizontal hitch assembly support portion, and a second horizontal hitch assembly support portion is connected to the riser support portion.

With a third embodiment of the invention, a slider sleeve is connected to a distal end of the first horizontal hitch assembly support portion. The slider sleeve jackets selected portions of the riser support portion. The slider sleeve includes first height lock pin reception channels. An array of second height lock pin reception channels is arrayed vertically along the riser support portion. A height lock pin is provided for reception in the first height lock pin reception channels and the second height lock pin reception channels when the first height lock pin reception channels and the second height lock pin reception channels are placed in registration for selecting a height adjustment between the first horizontal hitch assembly support portion and the second horizontal hitch assembly support portion. A lock pin securing member is connected to a distal end of the height lock pin.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved selectable trailer hitch apparatus which has all of the advantages of the prior art and none of the disadvantages.

It is another object of the present invention to provide a new and improved selectable trailer hitch apparatus which may be easily and efficiently manufactured and marketed.

It is a further object of the present invention to provide a new and improved selectable trailer hitch apparatus which is of durable and reliable construction.

An even further object of the present invention is to provide a new and improved selectable trailer hitch apparatus which is susceptible of a low cost of manufacture with regard to both materials and labor, and which accordingly is then susceptible of low prices of sale to the consuming public, thereby making such selectable trailer hitch apparatus available to the buying public.

Still yet a further object of the present invention is to provide a new and improved selectable trailer hitch apparatus which wherein it is not necessary to lift the trailer hitches off of a base plate to select an alternate trailer hitch.

Still another object of the present invention is to provide a new and improved selectable trailer hitch apparatus that does not include a bulky object which inhibits rotation of a trailer hitch support plate.

Yet another object of the present invention is to provide a new and improved selectable trailer hitch apparatus which includes plural trailer hitches arrayed symmetrically around the support plate rotation axle.

Even another object of the present invention is to provide a new and improved selectable trailer hitch apparatus that provides that a selected trailer hitch is directly supported by an underlying portion of a base plate.

Still a further object of the present invention is to provide a new and improved selectable trailer hitch apparatus which provides a flat planar relationship between the trailer hitch support plate and the base plate.

Yet another object of the present invention is to provide a new and improved selectable trailer hitch apparatus that provides a welded attachment between a base plate and a vehicle attachment member.

Still another object of the present invention is to provide a new and improved selectable trailer hitch apparatus which provides locking pin reception channels arrayed symmetrically around the support plate rotation axle.

Yet another object of the present invention is to provide a new and improved selectable trailer hitch apparatus that is suitable for use in a situation where the portion of the trailer that is connected to the hitch is substantially lower than the trailer-hitch supporting bracket on the vehicle.

Still a further object of the present invention is to provide a new and improved selectable trailer hitch apparatus that is adjustable for different trailers which have different heights with respect to the portions of the trailers that are connected to a hitch.

Yet another object of the present invention is to provide a new and improved selectable trailer hitch apparatus which is adjustable for trailers that have connections to trailer-hitch supporting brackets on vehicles from positions both lower than and higher than the trailer-hitch supporting brackets on the vehicles.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
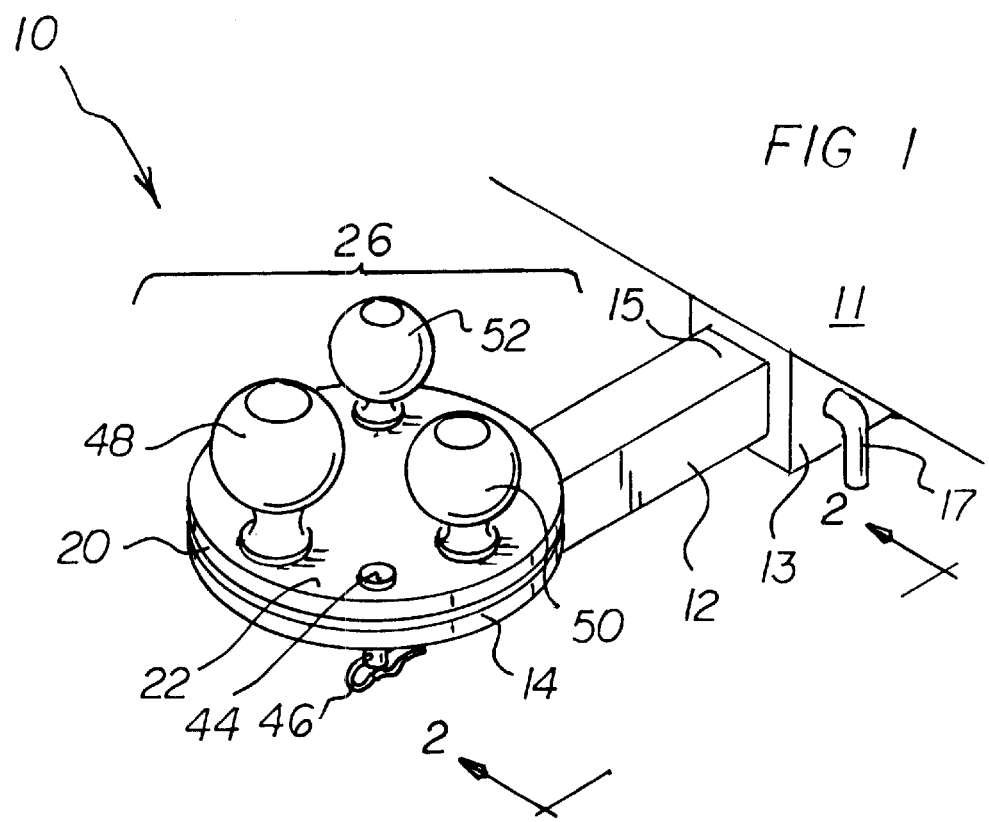
FIG. 1 is a perspective view showing a first embodiment of the selectable trailer hitch apparatus of the invention.
Figure 2:
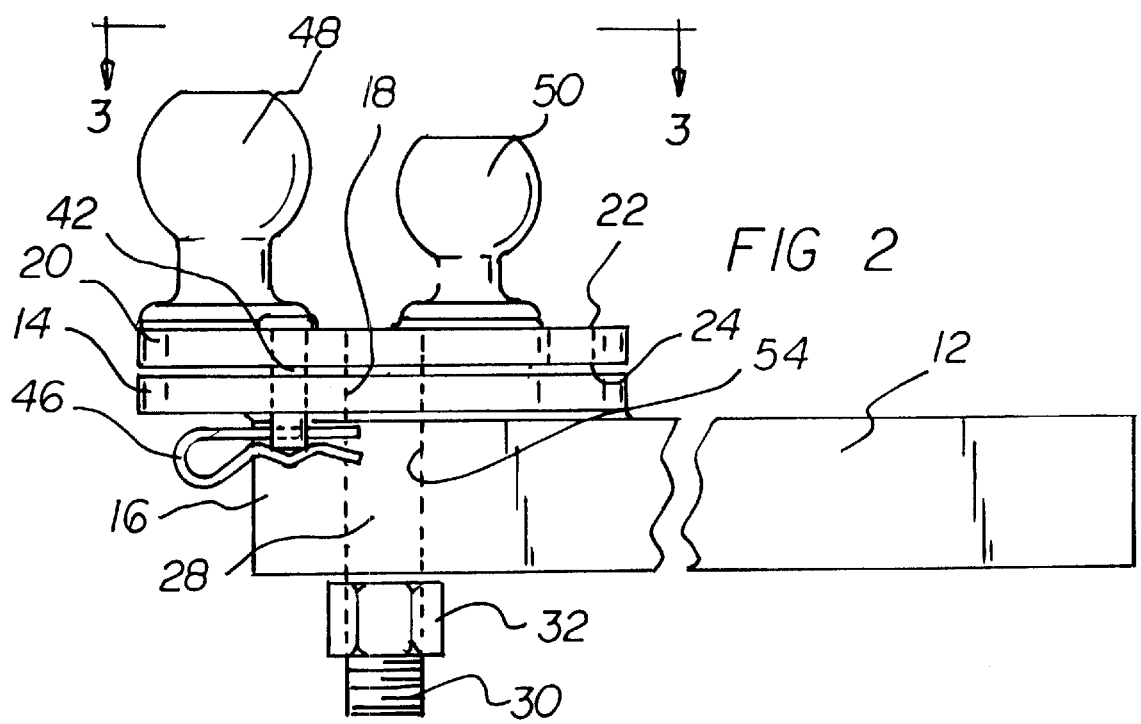
FIG. 2 is an enlarged side view of the embodiment of the selectable trailer hitch apparatus shown in FIG. 1 taken along line 2—2 of FIG. 1.
Figure 3:
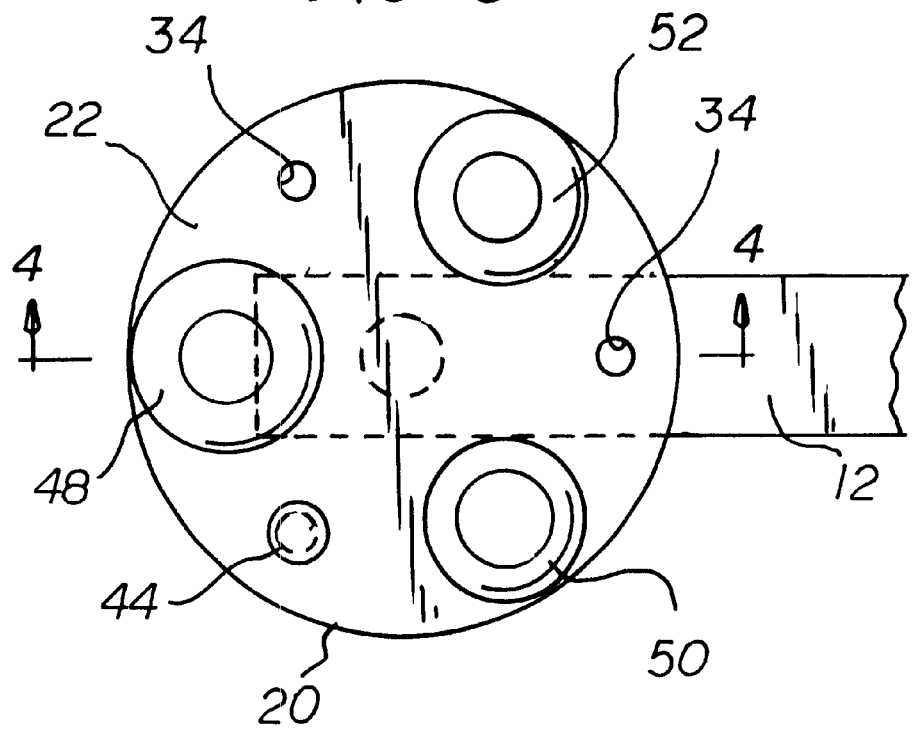
FIG. 3 is a top view of the embodiment of the selectable trailer hitch apparatus of FIG. 2 taken along line 3—3 thereof.
Figure 4:
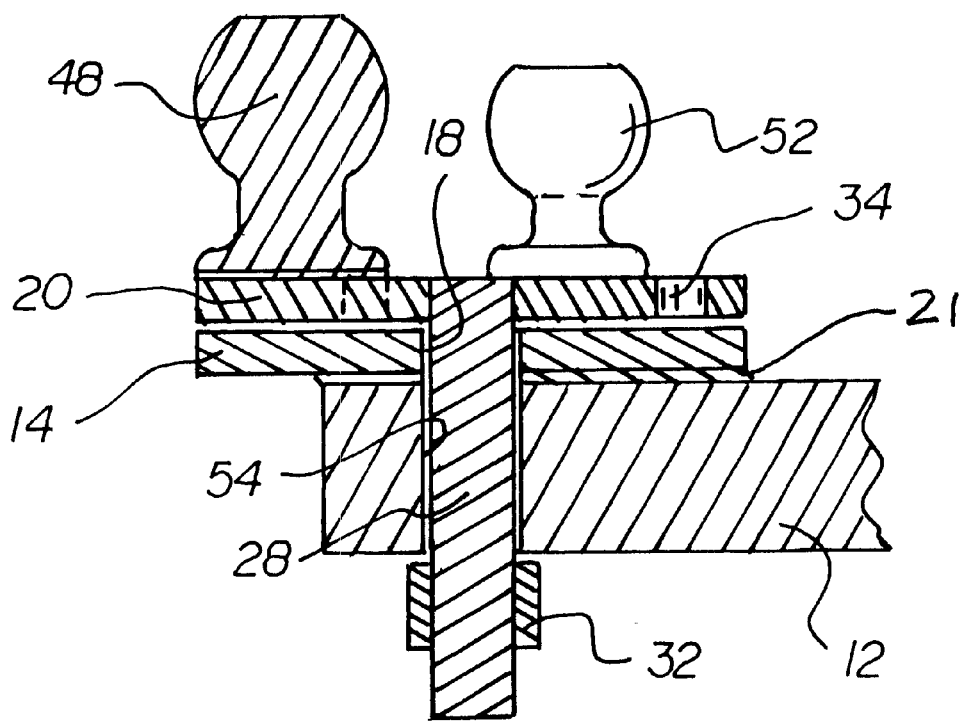
FIG. 4 is a cross-sectional view of the embodiment of the invention shown in FIG. 3 taken along line 4—4 thereof.
Figure 5:
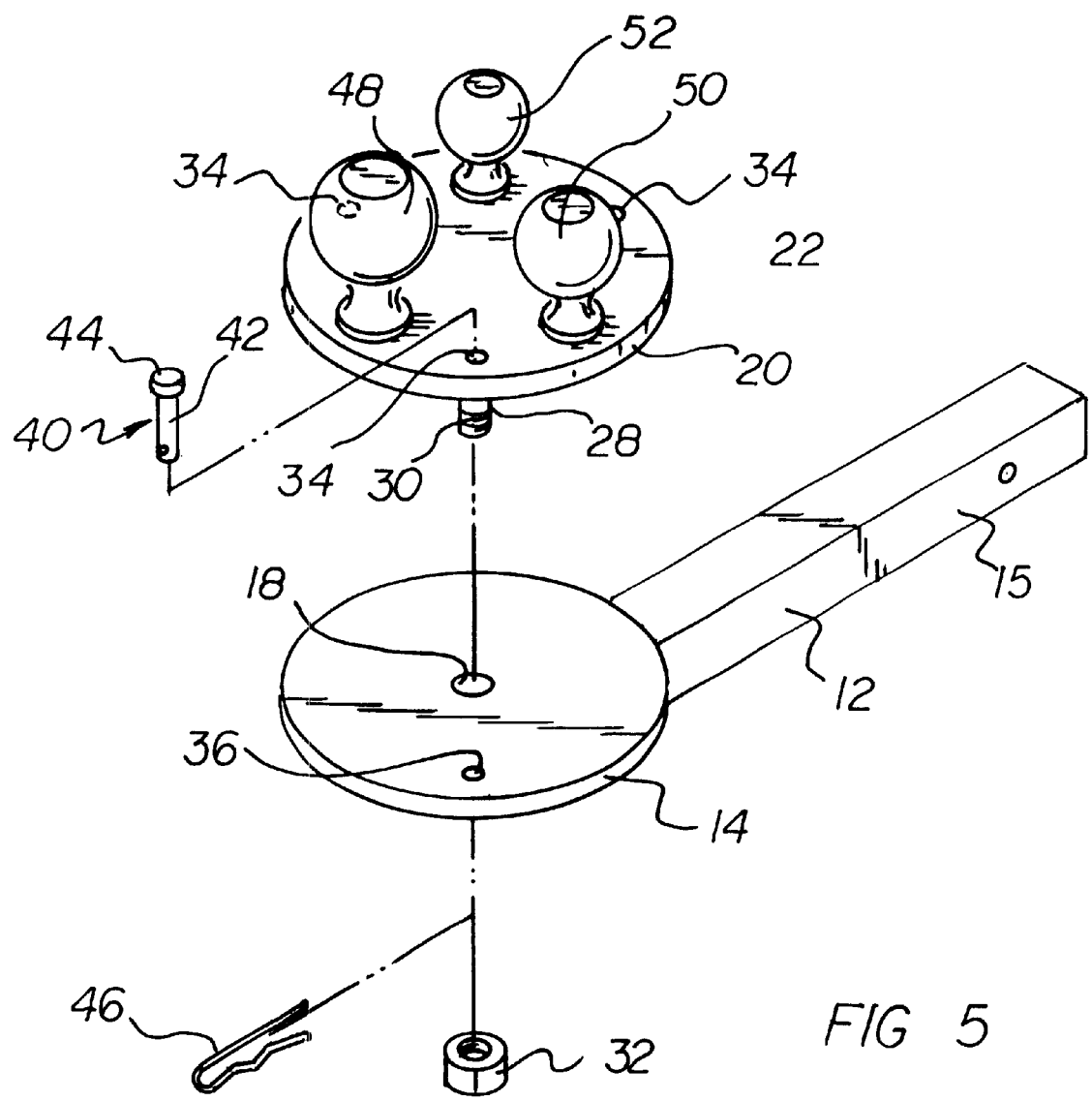
FIG. 5 is an exploded perspective view of the embodiment of the invention shown in FIG. 1.

With reference to the drawings, a new and improved selectable trailer hitch apparatus embodying the principles and concepts of the present invention will be described.

Turning to FIGS. 1–5, there is shown a first embodiment of the selectable trailer hitch apparatus of the invention generally designated by reference numeral 10. A selectable trailer hitch apparatus 10 is attached to a vehicle 11 and includes a vehicle attachment member 12 attached to the vehicle 11. With the first embodiment of the invention, the vehicle attachment member 12 is a single horizontal structure. A base plate 14 is attached to the vehicle attachment member 12. The base plate 14 is attached to the vehicle attachment member 12 by a welded attachment 21. The base plate 14 extends in a horizontal orientation and includes an axle reception channel 18. A hitch-supporting selector plate 20 includes a top side 22 and a bottom side 24, and a plurality of trailer hitches 26 are connected to the top side 22 of the hitch-supporting selector plate 20. The hitch-supporting selector plate 20 is in registration with the base plate 14. An axle 28 is connected to the bottom side 24 of the hitch-supporting selector plate 20, and the axle 28 is inserted into the axle reception channel 18. An axle retainer is connected to the axle 28 for securing the axle 28 in the axle reception channel 18. A selector plate lock is provided for locking the hitch-supporting selector plate 20 in a selected position with respect to the base plate 14. The axle retainer includes a threaded end 30, and a lock nut 32 is secured to the threaded end 30.

The selector plate lock includes a plurality of pin reception channels 34 in the hitch-supporting selector plate 20, wherein each selector plate pin reception channel 34 is associated with one of the trailer hitches 26. More specifically, three of the pin reception channels 36 are arrayed around the axle 28 at angular intervals of approximately one hundred twenty angular degrees. Three of the trailer hitches 26 are arrayed around the axle 28 at angular intervals of approximately one hundred twenty angular degrees, and the pin reception channels 36 are arrayed alternately between the trailer hitches 26 at angular intervals of approximately sixty angular degrees. A pin reception channel 36 is in the base plate 14. A lock pin 40, which is independent of the trailer hitches 26, includes a shaft portion 42 and a head portion 44, and the shaft portion 42 is insertable through a selected selector plate pin reception channel 34 and the base plate pin reception channel 36 when the selected selector plate pin reception channel 34 and the base plate pin reception channel 36 are placed in registration. A lock pin securing member 46 retains the lock pin 40 in a locking position with respect to the selected selector plate pin reception channel 34 the base plate pin reception channel 36. The lock pin securing member 46 is a cotter pin 46 that is received in a cotter pin reception channel at a distal end of the lock pin shaft portion 42.

The vehicle attachment member 12 includes a first end 15 attached to the vehicle 11 and includes a second end 16 distal to the first end 15. The trailer hitches 26 include a large size trailer hitch 48, an intermediate size trailer hitch 50, and a small size trailer hitch 52. The second end 16 of the vehicle attachment member 12 extends under the base plate pin reception channel 36 and includes an attachment member axle reception channel 54 for receiving the axle 28.

To use the selectable trailer hitch apparatus 10 of the invention, as shown in FIG. 1, the vehicle 11 has a bracket 13 which receives the first end 15 of the vehicle attachment member 12. A locking device 17 is used to secure the vehicle attachment member 12 to the vehicle bracket 13. The axle 28 is inserted through the axle reception channel 18 in the base plate 14 and through the attachment member axle reception channel 54 in the second end 16 of the vehicle attachment member 12. The lock nut 32 is screwed onto the threaded end 30 of the axle 28 to secure the hitch-supporting selector plate 20 to the base plate 14 and the vehicle attachment member 12. In this way, the hitch-supporting selector plate 20 is directly secured to the base plate 14 and indirectly secured to the vehicle attachment member 12, the vehicle bracket 13, and the vehicle 11.

To select one trailer hitch from the large size trailer hitch 48, the intermediate size trailer hitch 50, or the small size trailer hitch 52, the head portion 44 is grasped, and the lock pin 40 is removed from one of the selector plate pin reception channels 34 in which it is inserted. Once the lock pin 40 is removed, the hitch-supporting selector plate 20 can be rotated with respect to the base plate 14 until the desired trailer hitch is in the most distal position with respect to the vehicle 11. For example, in FIG. 1, the large size trailer hitch 48 is shown in the most distal position with respect to the vehicle 11. Then, with a respective selector plate pin reception channel 34 in registration with the base plate pin reception channel 36, the shaft portion 42 of the lock pin 40 is inserted through the selector plate pin reception channel 34 and the base plate pin reception channel 36. Then, the cotter pin 46 is inserted through the cotter pin reception channel in the shaft portion 42 of the lock pin 40. In this way, the selected large size trailer hitch 48 is locked into position for use. Other trailer hitches are selected in the same manner.

The hitch-supporting selector plate 20 and the base plate 14 can be made from steel plates. The vehicle attachment member 12 can be made from tubular steel, and the base plate 14 can be welded to the tubular steel.

Figure 6:
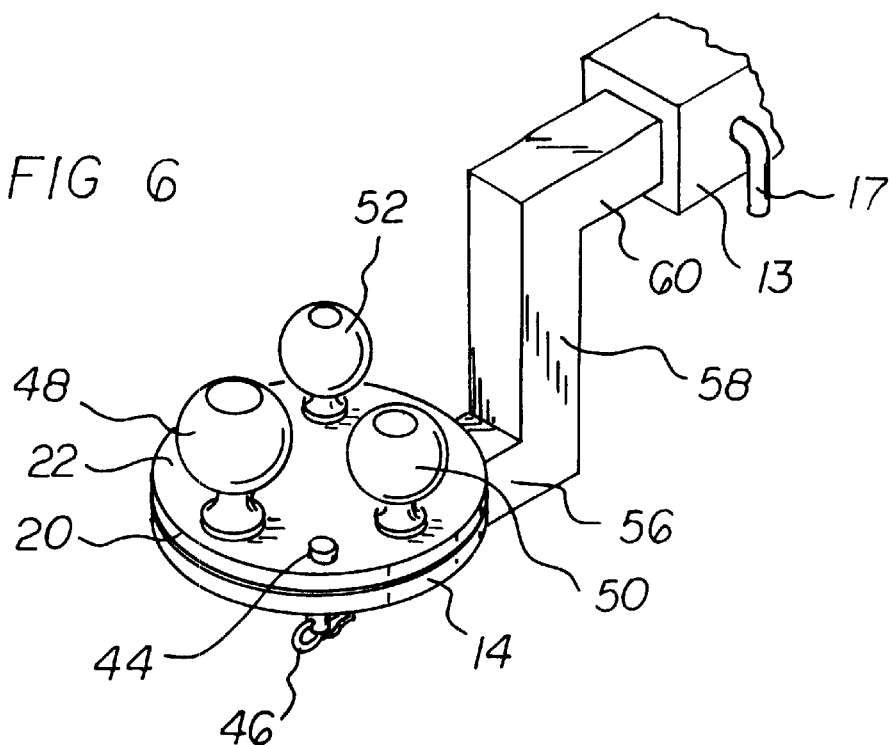
FIG. 6 is a perspective view showing a second embodiment of the invention in which trailer hitches are located at a fixed position lower than the trailer-hitch supporting bracket on the vehicle.
Figure 7:
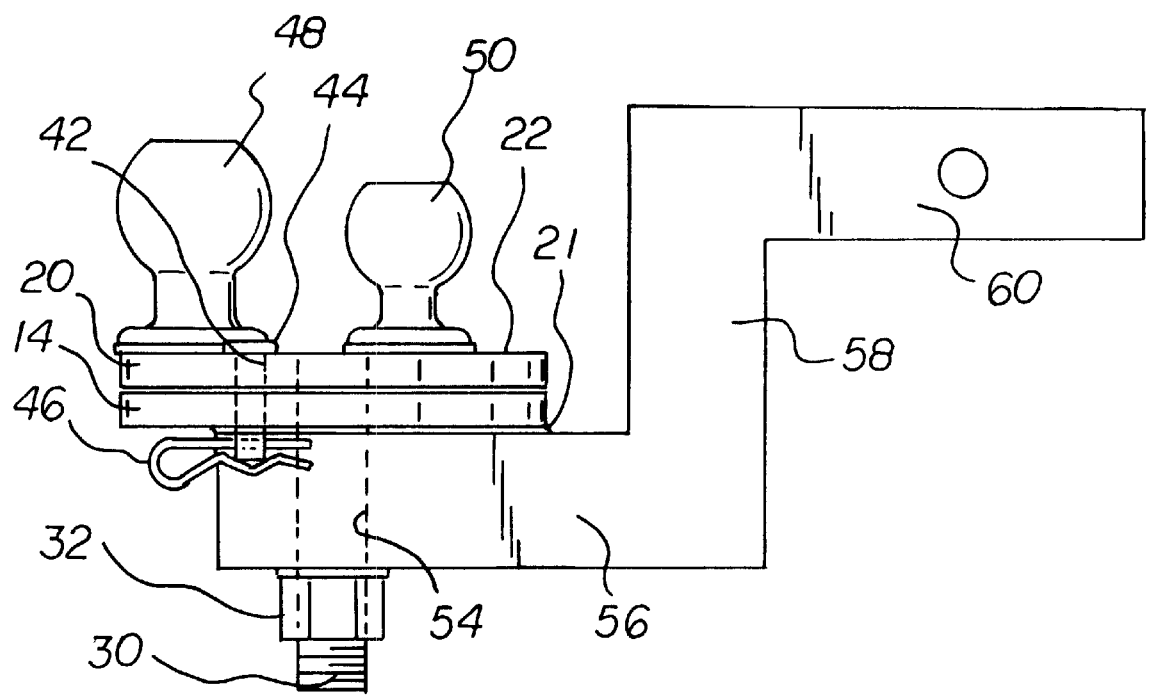
FIG. 7 is an enlarged side view of the embodiment of the invention shown in FIG. 6.

Turning to FIGS. 6 and 7, a second embodiment of the invention is shown. Reference numerals are shown that correspond to like reference numerals that designate like elements shown in the other figures. In addition, the vehicle attachment member includes a first horizontal hitch assembly support portion 56 which supports the base plate 14. A riser support portion 58 is connected to the first horizontal hitch assembly support portion 56, and a second horizontal hitch assembly support portion 60 is connected to the riser support portion 58.

With the embodiment of the invention shown in FIGS. 6 and 7, the first horizontal hitch assembly support portion 56 is in a fixed location with respect to the riser support portion 58 and the second horizontal hitch assembly support portion 60. In this respect, the trailer hitches are at a fixed location lower than the trailer-hitch supporting bracket on the vehicle, that is bracket 13.

Figure 8:
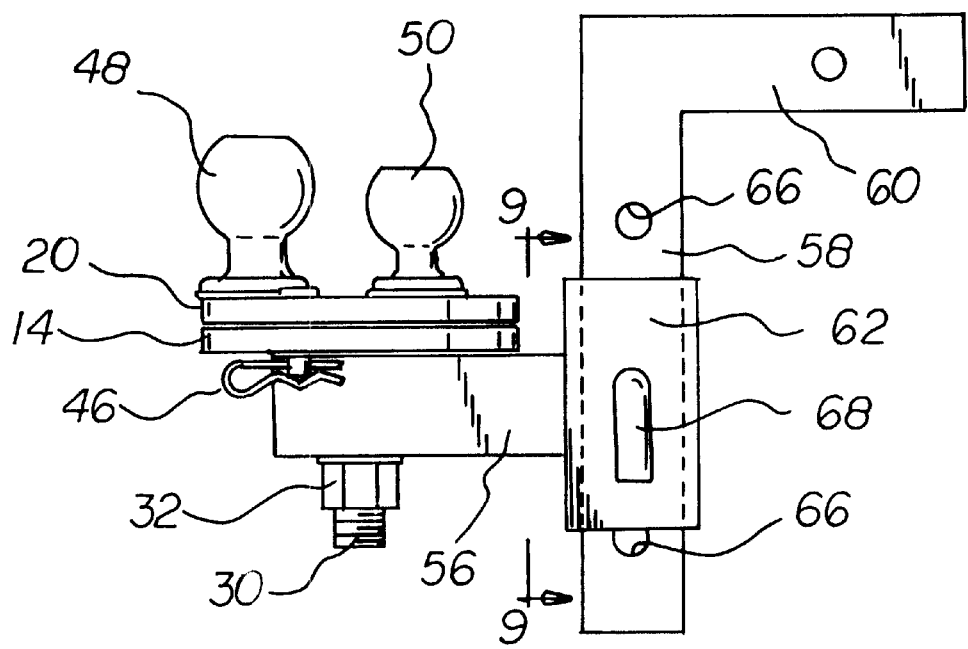
FIG. 8 is a side view of a third embodiment of the invention in which trailer hitches are located at adjustable positions lower than the trailer-hitch supporting bracket on the vehicle.
Figure 9:
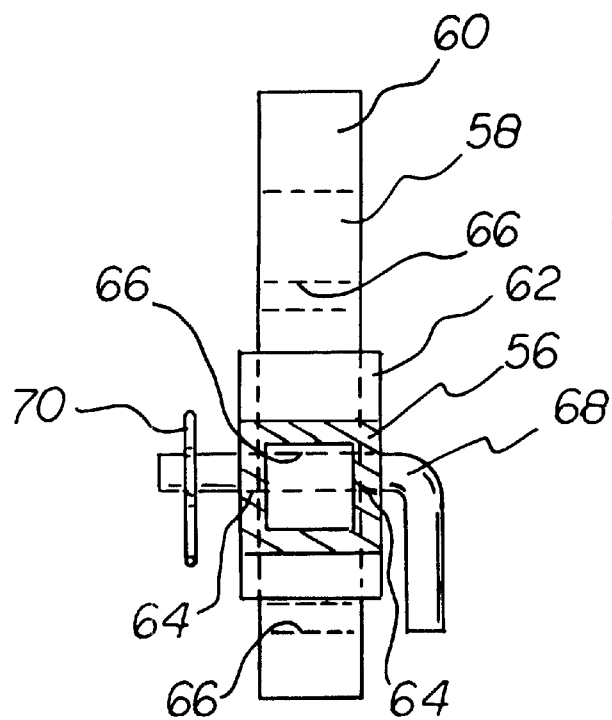
FIG. 9 is a partial cross-sectional view taken along line 9—9 of FIG. 8.

Turning to FIGS. 8 and 9, a third embodiment of the invention is shown. Reference numerals are shown that correspond to like reference numerals that designate like elements shown in the other figures. In addition, a slider sleeve 62 is connected to a distal end of the first horizontal hitch assembly support portion 56. The slider sleeve 62 jackets selected portions of the riser support portion 58. The slider sleeve 62 includes first height lock pin reception channels 64. An array of second height lock pin reception channels 66 is arrayed vertically along the riser support portion 58. A height lock pin 68 is provided for reception in the first height lock pin reception channels 64 and the second height lock pin reception channels 66 when the first height lock pin reception channels 64 and the second height lock pin reception channels 66 are placed in registration for selecting a height adjustment between the first horizontal hitch assembly support portion 56 and the second horizontal hitch assembly support portion 60. A lock pin securing member 70 is connected to a distal end of the height lock pin 68.

There are two basic ways to use the third embodiment of the invention. The first basic way is illustrated in FIGS. 8 and 9. With this way, the first horizontal hitch assembly support portion 56 can be adjusted to a number of different locations with respect to the riser support portion 58 and the second horizontal hitch assembly support portion 60. In this respect, the trailer hitches can be adjusted to a number of locations lower than the trailer-hitch supporting bracket on the vehicle.

More specifically, the slider sleeve 62 is slid up or down along the riser support portion 58. The second height lock pin reception channels 66 can be located at two inch intervals along the riser support portion 58 to accommodate trailers that connect to trailer hitches approximately two, four, or six inches below the trailer-hitch supporting bracket on the vehicle. When the appropriate height is selected the second height lock pin reception channels 66 and the first height lock pin reception channels 64 are placed in registration. Then, the height lock pin 68 is inserted into the registered first height lock pin reception channels 64 and second height lock pin reception channels 66 to secure the selected height adjustment. The lock pin securing member 70 is used to prevent the height lock pin 68 from slipping out from the first height lock pin reception channels 64 and the second height lock pin reception channels 66.

The second basic way of using the third embodiment of the invention is not illustrated in the drawings but is explained as follows. The slider sleeve 62 is removed from the riser support portion 58. The second horizontal hitch assembly support portion 60 is removed from the bracket 13, and the riser support portion 58 is rotated 180 degrees around the longitudinal axis of the second horizontal hitch assembly support portion 60. As a result, the riser support portion 58 rises above the second horizontal hitch assembly support portion 60. Then, the slider sleeve 62 is reinstalled on the riser support portion 58. Once this is done, the first horizontal hitch assembly support portion 56 can be adjusted to selected positions higher than the second horizontal hitch assembly support portion 60. That is, the trailer hitches can be positioned at a number of selected positions higher than the trailer-hitch supporting bracket on the vehicle to accommodate trailers needing same.

In general, the components of the selectable trailer hitch apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved selectable trailer hitch apparatus that is low in cost, relatively simple in design and operation, and which may advantageously be used without lifting the trailer hitches off of a base plate to select an alternate trailer hitch. With the invention, a selectable trailer hitch apparatus is provided which does not include a bulky object which inhibits rotation of a trailer hitch support plate. With the invention, a selectable trailer hitch apparatus is provided which includes plural trailer hitches arrayed symmetrically around the support plate rotation axle. With the invention, a selectable trailer hitch apparatus provides that a selected trailer hitch is directly supported by an underlying portion of a base plate. With the invention, a selectable trailer hitch apparatus provides a flat planar relationship between the trailer hitch support plate and the base plate.

With the invention, a selectable trailer hitch apparatus provides a welded attachment between a base plate and a vehicle attachment member. With the invention, a selectable trailer hitch apparatus provides locking pin reception channels arrayed symmetrically around the support plate rotation axle. With the invention, a selectable trailer hitch apparatus is provided which is suitable for use in a situation where the portion of the trailer that is connected to the hitch is substantially lower than the trailer-hitch supporting bracket on the vehicle. With the invention, a selectable trailer hitch apparatus is provided which is adjustable for different trailers which have different heights with respect to the portions of the trailers that are connected to a hitch. With the invention, a selectable trailer hitch apparatus is provided which is adjustable for trailers that have connections to trailer-hitch supporting brackets on vehicles from positions both lower than and higher than the trailer-hitch supporting brackets on the vehicles.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A selectable vehicle hitch apparatus for use with a vehicle having a hitch attachment bracket, said apparatus comprising:

a vehicle attachment member adapted to be received in said vehicle hitch attachment bracket, said vehicle attachment member having a distal end portion defining a longitudinal horizontally extending axis, a base plate attached to said vehicle attachment member distal end portion, wherein said base plate is circular in shape, said circular shaped base plate defining a central axis perpendicular to the horizontally extending axis of said vehicle attachment member, said base plate including a first axle reception channel located coaxially with respect to said central axis, a hitch supporting selector plate which includes a top side and a bottom side, said hitch supporting selector plate being circular in shape so as to be in substantial registration with said base plate with said bottom side of said hitch supporting selector plate confronting said base plate, a plurality of trailer hitches connected to said top side of said hitch supporting selector plate, an axle connected to said bottom side of said hitch supporting selector plate, wherein said axle is adapted to be received in said first axle reception channel in said base plate in co-linear alignment with said central axis to permit said hitch supporting selector plate to rotate angularly relative to said base plate about said central axis, wherein said end portion of said vehicle attachment member further includes a second axle reception channel for receiving said axle, a plurality of angularly spaced pin reception channels in said hitch supporting selector plate, each one of said pin reception channels being associated with a different one of said trailer hitches, respectively, a locking aperture in said base plate adapted to be aligned with each of said hitch associated pin reception channels when said hitch supporting selector plate is angularly rotated with respect to said central axis, and a selector plate locking pin adapted to be received in said locking aperture and a selected one of said hitch associated pin reception channels to lock said hitch supporting selector plate in a selected angular position relative to said base plate.

2. The apparatus of claim 1 wherein said base plate is attached to said attachment member by a welded attachment.

3. The apparatus of claim 1 wherein said locking aperture is radially spaced from said central axis and offset with respect to said horizontal longitudinal axis.

4. The apparatus of claim 1 further further including an axle retainer adapted to engage said axle when it is received in said first and second axle reception channels.

5. The apparatus of claim 4 wherein said axle retainer includes:
   a threader end, and
   a lock nut secured to said threaded end.

6. The apparatus of claim 4 wherein said trailer hitches includes a large size trailer hitch, an intermediate size trailer hitch, and a small size trailer hitch.

7. The apparatus of claim 1 wherein said base plate partially overhangs said vehicle attachment member distal end portion along said horizontally extending longitudinal axis thereof.

8. The apparatus of claim 1 wherein:
   three of said pin reception channels are arrayed around said central axis at angular intervals of approximately one hundred twenty angular degrees,
   three of said trailer hitches are arrayed around said central axis at angular intervals of approximately one hundred twenty angular degrees, and
   said pin reception channels are arrayed alternately between said trailer hitches at angular intervals of approximately sixty angular degrees.

9. The apparatus of claim 1 wherein said vehicle attachment member includes:
   a first horizontal hitch assembly support portion which supports said base plate,
   a riser support portion connected to said first horizontal hitch assembly support portion, and
   a second horizontal hitch assembly support portion connected to said riser support portion.

10. The apparatus of claim 9, further including:
    a slider sleeve connected to a distal end of said first horizontal hitch assembly support portion, wherein said slider sleeve jackets selected portions of said riser support portion, wherein said slider sleeve includes first height lock pin reception channels,
    an array of second height lock pin reception channels arrayed vertically along said riser support portion, and
    a height lock pin for reception in said first height lock pin reception channels and said second height lock pin reception channels when said first height lock pin reception channels and said second height lock pin reception channels are placed in registration for selecting a height adjustment between said first horizontal hitch assembly support portion and said second horizontal hitch assembly support portion.

11. The apparatus of claim 10, further including:
    a lock pin securing member connected to a distal end of said height lock pin.

* * * * *